US012597977B2

(12) United States Patent
Matsumura et al.

(10) Patent No.: US 12,597,977 B2
(45) Date of Patent: Apr. 7, 2026

(54) TERMINAL, RADIO COMMUNICATION METHOD, BASE STATION, AND SYSTEM FOR CONTROLLING UPLINK CONTROL CHANNEL TRANSMISSION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 597 days.

(21) Appl. No.: 17/754,709

(22) PCT Filed: Oct. 11, 2019

(86) PCT No.: PCT/JP2019/040281
§ 371 (c)(1),
(2) Date: Apr. 8, 2022

(87) PCT Pub. No.: WO2021/070374
PCT Pub. Date: Apr. 15, 2021

(65) Prior Publication Data
US 2023/0140695 A1 May 4, 2023

(51) Int. Cl.
*H04B 7/00* (2006.01)
*H04B 7/06* (2006.01)
*H04L 5/00* (2006.01)
*H04W 72/20* (2023.01)

(52) U.S. Cl.
CPC ....... *H04B 7/06952* (2023.05); *H04L 5/0053* (2013.01); *H04W 72/20* (2023.01)

(58) Field of Classification Search
None
See application file for complete search history.

(56) References Cited

U.S. PATENT DOCUMENTS

| | | | | |
|---|---|---|---|---|
| 10,812,242 B2 * | 10/2020 | Choi | ..................... | H04W 72/12 |
| 12,003,287 B2 * | 6/2024 | Yang | ..................... | H04L 5/0048 |
| 2019/0141693 A1 * | 5/2019 | Guo | ................. | H04W 72/1268 |
| 2020/0106569 A1 * | 4/2020 | Tsai | ..................... | H04W 72/23 |

FOREIGN PATENT DOCUMENTS

| | | | | |
|---|---|---|---|---|
| CN | 110769502 B | * | 3/2022 | ........... H04B 7/0404 |
| EP | 3734888 A1 | * | 11/2020 | ........... H04B 7/0695 |
| EP | 4203581 A1 | * | 6/2023 | ........... H04L 5/0078 |

(Continued)

OTHER PUBLICATIONS

International Search Report issued in PCT/JP2019/040281, mailed on May 19, 2020 (3 pages).

(Continued)

*Primary Examiner* — Gerald A Smarth
(74) *Attorney, Agent, or Firm* — Osha Bergman Watanabe & Burton LLP

(57) ABSTRACT

A terminal according to one aspect of the present disclosure includes: a receiving section that receives information relating to at least one of the number and indices of uplink control channel resource groups; and a control section that determines a corresponding relation between indices of the uplink control channel resource groups and a plurality of uplink control channel resources included in an uplink control channel resource set, based on the information.

4 Claims, 10 Drawing Sheets

PUCCH RESOURCE SET 1

| DCI | RESOURCE |
|---|---|
| 000 | RESOURCE #1 |
| 001 | RESOURCE #2 |
| 010 | RESOURCE #3 |
| 011 | RESOURCE #4 |
| 100 | RESOURCE #5 |
| 101 | RESOURCE #6 |
| 110 | RESOURCE #7 |
| 111 | RESOURCE #8 |

PUCCH RESOURCE GROUP 0

PUCCH RESOURCE SET 2

| DCI | RESOURCE |
|---|---|
| 000 | RESOURCE #1 |
| 001 | RESOURCE #2 |
| 010 | RESOURCE #3 |
| 011 | RESOURCE #4 |
| 100 | RESOURCE #5 |
| 101 | RESOURCE #6 |
| 110 | RESOURCE #7 |
| 111 | RESOURCE #8 |

NUMBER OF UCI BITS

(56) References Cited

FOREIGN PATENT DOCUMENTS

WO     WO-2020020128 A1 *  1/2020  ........... H04B 7/0404

OTHER PUBLICATIONS

Written Opinion of the International Searching Authority PCT/JP2019/040281, mailed on May 19, 2020 (3 pages).
NTT Docomo, Inc.; "Discussion on multi-beam enhancement"; 3GPP TSG RAN WG1 #98bis, R1-1911185; Chongqing, China, Oct. 14-20, 2019 (20 pages).
NTT Docomo, Inc.; "Enhancements on multi-TRP/panel transmission"; 3GPP TSG RAN WG1 #97, R1-1906224; Reno, USA, May 13-17, 2019 (7 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-Utran); Overall description; Stage 2 (Release 8)"; Mar. 2010 (149 pages).
Office Action in the counterpart Chinese Application No. 201980102920.5, mailed May 27, 2023 (14 pages).
Office Action in the counterpart Japanese Application No. 2021-551083, mailed May 16, 2023 (4 pages).
NTT Docomo, Inc.: "Discussion on multi-beam enhancement", 3GPP TSG RAN WG1 #97, R1-1906225, Reno, USA, May 13-17, 2019 (24 pages).
Qualcomm Incorporated: "Multi-TRP Enhancements", 3GPP TSG-RAN WG1 Meeting #97, R1-1907289, May 13-17, 2019 (25 pages).

* cited by examiner

FIG. 3A

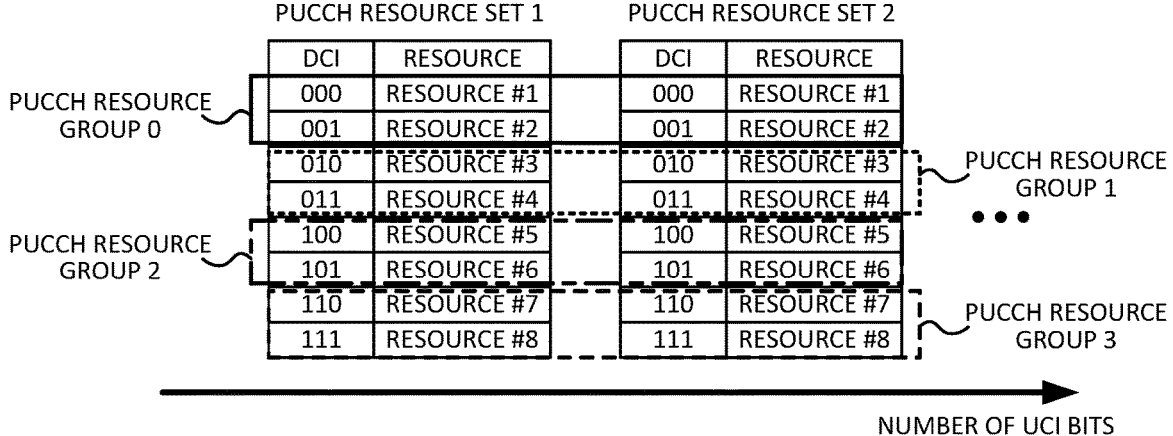

PUCCH RESOURCE SET 1          PUCCH RESOURCE SET 2

| DCI | RESOURCE | | DCI | RESOURCE |
|-----|----------|--|-----|----------|
| 000 | RESOURCE #1 | | 000 | RESOURCE #1 |
| 001 | RESOURCE #2 | | 001 | RESOURCE #2 |
| 010 | RESOURCE #3 | | 010 | RESOURCE #3 |
| 011 | RESOURCE #4 | | 011 | RESOURCE #4 |
| 100 | RESOURCE #5 | | 100 | RESOURCE #5 |
| 101 | RESOURCE #6 | | 101 | RESOURCE #6 |
| 110 | RESOURCE #7 | | 110 | RESOURCE #7 |
| 111 | RESOURCE #8 | | 111 | RESOURCE #8 |

PUCCH RESOURCE GROUP 0

PUCCH RESOURCE GROUP 1

NUMBER OF UCI BITS

FIG. 3B

PUCCH RESOURCE SET 1          PUCCH RESOURCE SET 2

| DCI | RESOURCE | | DCI | RESOURCE |
|-----|----------|--|-----|----------|
| 000 | RESOURCE #1 | | 000 | RESOURCE #1 |
| 001 | RESOURCE #2 | | 001 | RESOURCE #2 |
| 010 | RESOURCE #3 | | 010 | RESOURCE #3 |
| 011 | RESOURCE #4 | | 011 | RESOURCE #4 |
| 100 | RESOURCE #5 | | 100 | RESOURCE #5 |
| 101 | RESOURCE #6 | | 101 | RESOURCE #6 |
| 110 | RESOURCE #7 | | 110 | RESOURCE #7 |
| 111 | RESOURCE #8 | | 111 | RESOURCE #8 |

PUCCH RESOURCE GROUP 0

PUCCH RESOURCE GROUP 2

PUCCH RESOURCE GROUP 1

PUCCH RESOURCE GROUP 3

NUMBER OF UCI BITS

PUCCH RESOURCE SET 1          PUCCH RESOURCE SET 2

| DCI | RESOURCE | DCI | RESOURCE |
|-----|----------|-----|----------|
| 000 | RESOURCE #1 | 000 | RESOURCE #1 |
| 001 | RESOURCE #2 | 001 | RESOURCE #2 |
| 010 | RESOURCE #3 | 010 | RESOURCE #3 |
| 011 | RESOURCE #4 | 011 | RESOURCE #4 |
| 100 | RESOURCE #5 | 100 | RESOURCE #5 |
| 101 | RESOURCE #6 | 101 | RESOURCE #6 |
| 110 | RESOURCE #7 | 110 | RESOURCE #7 |
| 111 | RESOURCE #8 | 111 | RESOURCE #8 |

PUCCH RESOURCE GROUP 0

PUCCH RESOURCE GROUP 1

PUCCH RESOURCE GROUP 2

NUMBER OF UCI BITS

TERMINAL, RADIO COMMUNICATION METHOD, BASE STATION, AND SYSTEM FOR CONTROLLING UPLINK CONTROL CHANNEL TRANSMISSION

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

In existing LTE systems (LTE Rel. 8 to Rel. 14, for example), a user terminal (UE (User Equipment)) controls transmission of an uplink shared channel (Physical Uplink Shared Channel (PUSCH)) based on downlink control information (DCI). The UE controls transmission of uplink control information such as HARQ-ACK and CSI by using an uplink control channel (Physical Uplink Control Channel (PUSCH)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (NR, for example), designating one of a plurality of candidates configured by higher layer signaling by using control information (for example, media access control (MAC) control element (CE), downlink control information (DCI), or the like) is under study, for beams (spatial relations) of uplink (UL) transmission for a PUCCH, PUSCH, and SRS.

Meanwhile, how to appropriately configure a spatial relation is an issue when the number of the candidates for the spatial relation that can be configured increases. Inappropriate configuration of the spatial relation may cause deterioration in communication quality.

Accordingly, an object of the present disclosure is to provide a user terminal and a radio communication method which can appropriately control a spatial relation (a UL beam, for example) applied to UL transmission.

Solution to Problem

A terminal according to one aspect of the present disclosure includes: a receiving section that receives information relating to at least one of the number and indices of uplink control channel resource groups; and a control section that determines a corresponding relation between indices of the uplink control channel resource groups and a plurality of uplink control channel resources included in an uplink control channel resource set, based on the information.

Advantageous Effects of Invention

According to one aspect of the present disclosure, a spatial relation (a UL beam, for example) to be applied to the UL transmission can be controlled appropriately.

BRIEF DESCRIPTION OF DRAWINGS

FIGS. 3A and 3B are each a diagram to show one example of a corresponding relation between PUCCH resource groups and PUCCH resources;

FIG. 6B is a diagram further to show another example of a corresponding relation between PUCCH resource groups and PUCCH resources;

DESCRIPTION OF EMBODIMENTS

Figure 1:
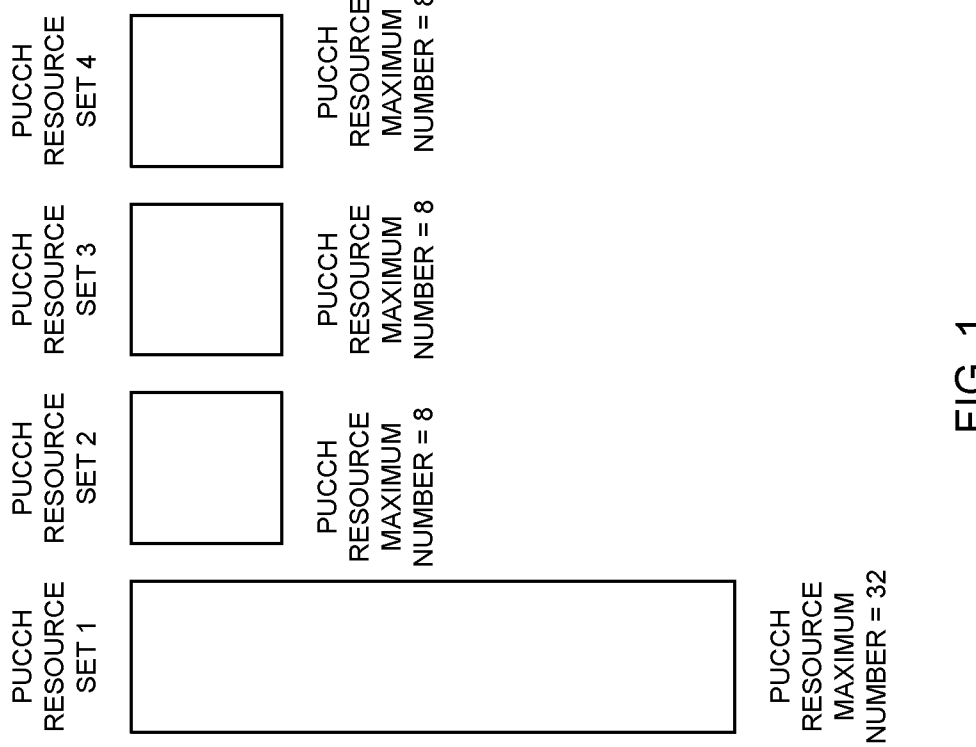
FIG. 1 is a diagram to show one example of a relation between PUCCH resource sets and PUCCH resources.

In NR, control of reception processing (at least one of reception, demapping, demodulation, and decoding, for example) and transmission processing (at least one of transmission, mapping, precoding, modulation, and coding, for example) of at least one of a signal and channel (referred to as a signal/channel) in UE, based on a transmission configuration indication state (TCI state) is under study.

The TCI state may be referred to as that applied to a downlink signal/channel. The TCI state applied to an uplink signal/channel may be referred to as a spatial relation.

A UE may be configured with a parameter (PUCCH configuration information (PUCCH-Config), for example) required for transmission of an uplink control channel (PUCCH, for example) by higher layer signaling. The PUCCH configuration information may include a list of PUCCH resource set information (PUCCH-ResourceSet, for example) and a list of PUCCH spatial relation information (PUCCH-SpatialRelationInfo, for example).

The higher layer signaling may be any one of or combination of RRC (Radio Resource Control) signaling, MAC (Medium Access Control) signaling, broadcast information, and the like, for example.

The MAC signaling may use a MAC control element (MAC CE), MAC PDU (Protocol Data Unit), and the like, for example. The broadcast information may be master information blocks (MIBs), system information blocks (SIBs), remaining minimum system information (RMSI), other system information (OSI), or the like, for example.

The PUCCH Resource set information may include a list (resourceList, for example) of PUCCH resource indices (IDs, for example, PUCCH-ResourceId).

When the UE does not have individual PUCCH resource configuration information provided by the PUCCH resource set information in the PUCCH configuration information (before RRC is set up), the UE may determine a PUCCH resource set, based on an upper layer parameter in system information (System Information Block Type 1 (SIB1, RMSI)).

The UE may determine a PUCCH resource index $r_{PUCCH}$ based on a PUCCH resource indicator (PRI) field $\Delta_{PRI}$ in DCI format 1_0 or 1_1, the number of CCEs $N_{CCE, 0}$ in a control resource set (CORESET) for PDCCH reception for carrying the DCI, and the index $n_{CCE, 0}$ of the initial (first) CCE, in the PDCCH reception.

Contrary, the UE, when having individual PUCCH resource configuration information (after RRE is ser up), may determine a PUCCH resource set index, based on the number of UCI information bits.

When the number of PUCCH resources in the determined PUCCH resource set is eight or less, the UE may determine a PUCCH resource index according to the PUCCH resource notification field in DCI format 1_0 or 1_1.

When the number of PUCCH resources in the initial PUCCH resource set (UCI) is greater than eight, the UE may determine a PUCCH resource index, based on the PUCCH resource notification field $\Delta_{PRI}$ in DCI format 1_0 or 1_1, the number of CCEs $N_{CCE, p}$ in a CORESET p for the PDCCH reception for carrying the DCI, and the index $n_{CCE, p}$ of the initial CCE received by the PDCCH.

Regarding the PUCCH resource set information, the maximum number (maxNrofPUCCH-ResourceSet, for example) of the PUCCH resource sets in each PUCCH resource set group may be a certain value (four, for example), as illustrated in FIG. 1. The maximum number of PUCCH resources (maxNrofPUCCH-ResourcesPerSet, for example) in each PUCCH resource set may be a certain value (32, for example). The maximum number (maxNrof-PUCCH-Resources) of all the PUCCH resources may be a certain value (128, for example).

The PUCCH spatial relation information may indicate a plurality of candidate beams (referred to also as a spatial domain filter) for PUCCH transmission. The PUCCH spatial relation information may indicate spatial association between an RS (Reference signal) and a PUCCH.

The list of pieces of PUCCH spatial relation information includes at least one entry (PUCCH spatial relation information, PUCCH spatial relation IE (Information Element). Each piece of PUCCH spatial relation information may include a PUCCH spatial relation information index (ID) (pucch-SpatialRelationInfoId, for example), a serving cell index (ID) (servingCellId, for example), and an RS index. The RS index may be one of an SSB (SS (Synchronization Signal) block, an SS/PBCH (Physical Broadcast CHannel) block) index, an NZP (Non-Zero Power)-CSI-RS resource configuration ID, and an SRS resource configuration ID. The SSB Index, NZP-CSI-RS resource configuration ID, and the SRS resource configuration ID may be associated with at least one of the beam, resource, and port, which are selected through measurement by a corresponding RS.

At least one of the plurality of pieces of PUCCH spatial relation information (PUCCH-SpatialRelationInfo or candidate beam, for example) in the list of the pieces of PUCCH spatial relation information may be indicated by a MAC (Medium Access Control) CE (Control Element).

The UE may receive a MAC CE (PUCCH spatial relation information activation/deactivation MAC CE, PUCCH spatial relation information indication MAC CE) that activates or deactivates PUCCH spatial relation information.

Figure 2:
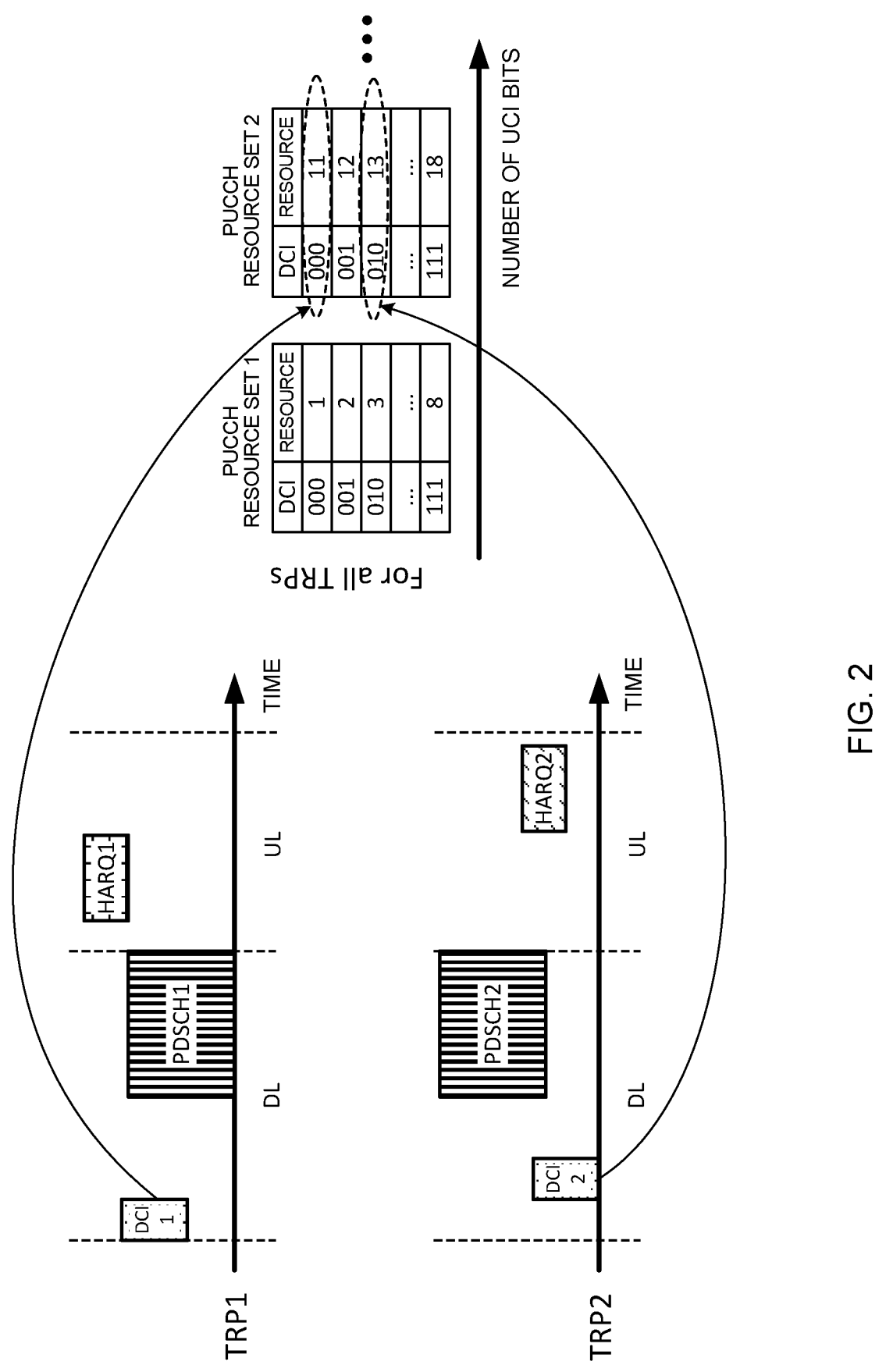
FIG. 2 is a diagram to show one example in which a plurality of TRPs share a PUCCH resource set for application.

When uplink control information (HARQ-ACK, for example) is to be transmitted to each of a plurality of TRPs by using an uplink control channel, configuration of different spatial relation information for the PUCCH resource corresponding to each TRP may be necessary in some cases. For example, when a certain PUCCH resource set configured for the UE is shared among a plurality of TRPs, a different spatial relation information is desired to be configured for each of the PUCCH resources included in the PUCCH resource set (FIG. 2). Here, a case where a PUCCH resource set 1 and a PUCCH resource set 2 are configured in common for a plurality of TRPs is illustrated.

FIG. 2 shows a case where a PUCCH resource used for transmission to TRP 1 and a PUCCH resource used for transmission to TRP 2 are selected from among the PUCCH resources included in the same PUCCH resource set 2. In this case, a PUCCH resource 1 used for transmission to TRP 1 and a PUCCH resource 3 used for transmission to TRP 1 are desired to be configured with respective pieces of spatial relation information.

However, configuration of different spatial relation information for each PUCCH resource results in increased overhead in the control information (higher layer signaling (or MAC CE), for example). Thus, it is under study to configure PUCCH resource groups each corresponding to or associated with a single or a plurality of PUCCH resources and to configure spatial relation information for each PUCCH resource group. These can prevent increased overhead in the control information.

Here, the problem is how to control the association between the PUCCH resources and the PUCCH groups. For example, when the number of PUCCH groups (or pieces of spatial relation information) configured for the UE is changeable or variable, how to associate the PUCCH resources and the PUCCH groups is a problem.

The inventors of the present invention have studied the association between the PUCCH resources and the PUCCH groups and came up with the idea of one aspect of the present invention.

Embodiments of the present disclosure will be described in detail below with reference to the drawings. The configurations described below may be applied individually or in combination. Note that the description below can include both a case where a UE uses a single transmitting/receiving point (TRP) for communication and a case where a UE uses a plurality of transmitting/receiving points (TRPs) for communication.

Embodiments

In this aspect, PUCCH resource groups each corresponding to (or associated with) a single or a plurality of PUCCH resources are configured, and spatial relation information is configured for each of the PUCCH resource groups. The PUCCH resource group may be referred to as a PUCCH group, spatial relation group, spatial relation information group, spatial group, beam group, and the like.

The corresponding relation between PUCCH resource group indices and PUCCH resources may be determined based on the number of PUCCH resource groups (or PUCCH resource group indices) to be configured for a UE. Note that the corresponding relation between the PUCCH resource group indices and the PUCCH resources may be interpreted as a corresponding relation between the PUCCH resources and spatial relations or a corresponding relation between the PUCCH resource group indices and the spatial relations.

A network (base station, for example) may notify the UE of information relating to PUCCH resource groups by using higher layering signaling or the like. The UE determines the number of the PUCCH resource groups, based on the information relating to the PUCCH resource groups received. Spatial relation information corresponding to each PUCCH resource group may be defined by a specification or may be configured by higher layer signaling or the like.

Information relating to the PUCCH resource groups may be a value indicating the number of the PUCCH resource groups configured for the UE or may be a PUCCH resource group index (indices) configured or activated. The PUCCH resource groups may each be configured for each cell, carrier, or bandwidth part (BWP).

Certain PUCCH resource group indices ({0, 1, 2, 3}, for example) may be configured or supported, part of the indices ({0, 1}, for example) may be configured for the UE. In this case, the UE may determine that the number of applicable PUCCH resource groups is two, based on the number of PUCCH resource groups to be configured.

The UE may assume that the PUCCH resource group indices to be configured are used in a sequential manner from the one with a smaller number. For example, when the number of PUCCH resource group indices to be configured is one, the UE may determine that PUCCH resource group index 0 is configured. Alternatively, the UE may assume that arbitrary PUCCH resource group indices are configured.

The UE may determine the corresponding relation between the PUCCH resource group indices and one or more PUCCH resources, based on at least one of the number of PUCCH resource groups and the PUCCH group resource indices to be configured.

A PUCCH resource set may include one or more PUCCH resources. A base station may configure information relating to a plurality of PUCCH resources included in a PUCCH resource set, for the UE by using higher layer signaling or the like. The base station may designate a particular PUCCH resource to use for PUCCH transmission, from a plurality of PUCCH resources by using a certain bit field of downlink control information.

The certain bit field may be a PUCCH resource indicator (PRI) field. Each code point of the PUCCH resource indicator field may be associated with a plurality of PUCCH resources configured by an in a higher layer or the like.

When the PUCCH resource indicator field is configured of 3 bits, for example, eight or less PUCCH resources are associated with the code points. When the PUCCH resource indicator field is configured of 2 bits, four or less PUCCH resources are associated with the code points.

Association between the PUCCH resource group indices and the PRI field code points (or PUCCH resources associated with the code points) may be changed based on the number of PUCCH resource groups configured for the UE.

One association example between the PUCCH resource group indices and the PRI field code points will be described below.

<First Association>

In first association, PRI field code points and PUCCH resource group indices are associated with each other in such a manner that a certain PUCCH resource group index corresponds to consecutive code points. Note that the PRI field code points may be interpreted as code points corresponding to the PUCCH resources.

The order of the code points in this specification is assumed to be 000, 001, 010, 011, 100, 101, 110, and 111. For example, 000 and 001 correspond to consecutive code points while 000 and 010 are nonconsecutive code points.

In a case of configuring a plurality of (N, for example) PUCCH resource groups, association may be performed in such a manner that the difference between the numbers of the code points (or PUCCH resources) corresponding to the respective PUCCH resource groups is zero or minimal. For example, when the number of the code points (or PUCCH resources) is assumed to be M, M/N code points may correspond to each of the PUCCH resource groups.

When the PUCCH resources are associated with the code points, a PUCCH resource group of a smaller index may be prioritized to be associated with the initial code point (000) first. For example, a certain number (M/N) of initial code points may be associated with a PUCCH resource group of the smallest index. Specifically, each of M/N code points from the initial code point may be associated with the respective PUCCH resource group indices ({0, 1, . . . , M−1}, for example).

The association between the code points and the PUCCH resource groups when the number of the PUCCH resource groups to be configured or activated is one, two, three, and four will be described below. In the description below, eight PUCCH resources (or PUCCH resources corresponding to eight code points) are configured for each PUCCH resource set. Note that the numbers of configured PUCCH resource groups, code points, PUCCH resources, and the like are not limited to the numbers above.

[Number of PUCCH Resource Groups: 2]

FIG. 3A illustrates an example of association between PUCCH resource group indices and code points (or PUCCH resources corresponding to the code points) where two PUCCH resource groups (in this case {0, 1}) are configured or activated.

PUCCH resource group 0 is associated with the initial four (M/N=8/2) consecutive code points (000, 001, 010, and 011). PUCCH resource group 1 is associated with the remaining code points (100, 101, 110, and 111).

Based on the association, the UE can determine a PUCCH resource group corresponding to a particular code point (or PUCCH resource) notified by a PRI field of DCI. The UE can perform PUCCH transmission by using spatial relation information corresponding to the PUCCH resource group determined. For example, when 010 is notified by a PRI field of DCI, the UE performs PUCCH transmission by using spatial relation information corresponding to PUCCH resource group 0, and PUCCH resource 3.

[Number of PUCCH Resource Groups: 4]

FIG. 3B illustrates an example of association between PUCCH resource group indices and code points where four PUCCH resource groups (in this case {0, 1, 2, 3}) are configured or activated.

PUCCH resource group 0 is associated with the initial two (M/N=8/4) consecutive code points (000 and 001). PUCCH resource group 1 is associated with the next two consecutive code points (010 and 011). PUCCH resource group 2 is associated with the following two consecutive code points (100 and 101). PUCCH resource group 3 is associated with the next two consecutive code points (110 and 111).

Based on the association, the UE can determine a PUCCH resource group corresponding to a particular code point (or PUCCH resource) notified by a PRI field of DCI. The UE can perform PUCCH transmission by using spatial relation information corresponding to the PUCCH resource group determined. For example, when 010 is notified by a PRI field of DCI, the UE performs PUCCH transmission by using spatial relation information corresponding to PUCCH resource group 1, and PUCCH resource 3.

[Number of PUCCH Resource Groups: 1]

Figures 4A, 4B:
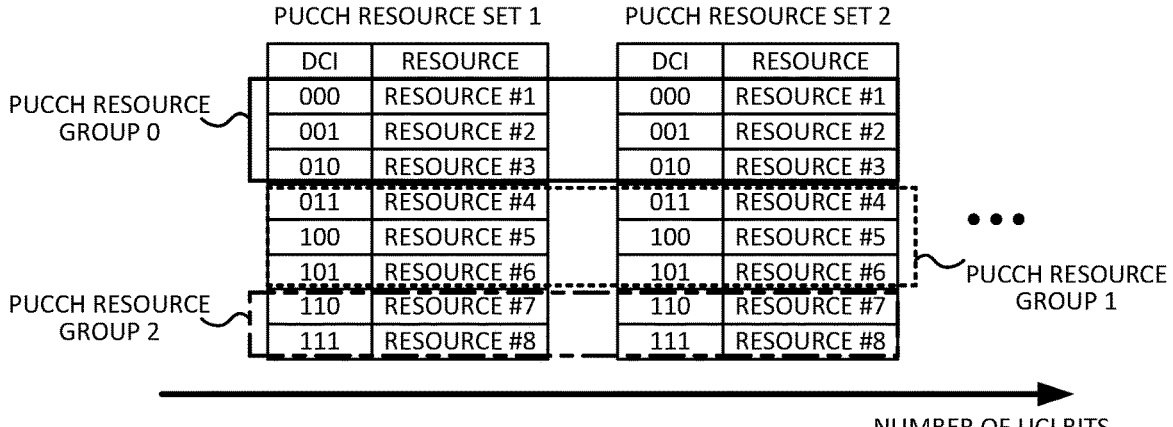
FIGS. 4A and 4B are each a diagram to show another example of a corresponding relation between PUCCH resource groups and PUCCH resources.

FIG. 4A illustrates an example of association between a PUCCH resource group index and code points where a single PUCCH resource group (in this case {0}) is configured or activated.

PUCCH resource group 0 is associated with the initial eight (M/N=8/1) consecutive code points (000, 001, 010, 011, 100, 101, 110, and 111).

Based on the association, the UE can determine a PUCCH resource group corresponding to a particular code point (or PUCCH resource) notified by a PRI field of DCI. Here, the UE performs PUCCH transmission by using spatial relation information corresponding to PUCCH resource group 0 in response to any one of the notified code points because only one PUCCH group is configured.

[Number of PUCCH Resource Groups: 3]

FIG. 4B illustrates an example of association between PUCCH resource group indices and code points where four PUCCH resource groups (in this case {0, 1, 2}) are configured or activated.

PUCCH resource group 0 is associated with the initial three consecutive code points (000, 001, and 010). PUCCH resource group 1 is associated with the next three consecutive code points (011, 100, and 101). PUCCH resource group 2 is associated with the next two consecutive code points (110 and 111).

Note that the PUCCH resource group with a smaller index is associated with a larger number of code points (or PUCCH resources) here; however, this is not restrictive. For example, the PUCCH resource group with a smaller index may be associated with a larger number of code points (or PUCCH resources), for example.

Based on the association, the UE can determine a PUCCH resource group corresponding to a particular code point (or PUCCH resource) notified by a PRI field of DCI. The UE can perform PUCCH transmission by using spatial relation information corresponding to the PUCCH resource group determined. For example, when 010 is notified by a PRI field of DCI, the UE performs PUCCH transmission by using spatial relation information corresponding to PUCCH resource group 0, and PUCCH resource 3.

As described above, the number of PUCCH resource groups to be configured for the UE can be easily controlled by changing association between the PUCCH resource group indices and the code points (or PUCCH resources) in accordance with the number of PUCCH resource groups.

<Second Association>

In second association, PRI field code points and PUCCH resource group indices are associated with each other in such a manner that a certain PUCCH resource group index corresponds to at least nonconsecutive code points.

In a case of configuring a plurality of (N, for example) PUCCH resource groups, the N PUCCH resource groups may be associated with the code points in such a manner that the difference between the numbers of the code points corresponding to the respective PUCCH resource groups is 0 or minimal. For example, when the number of code points (or PUCCH resources) is assumed to be M, M/N code points (or PUCCH resources) may correspond to each of the PUCCH resource groups. The M/N code points may include at least two code points that are nonconsecutive.

When the PUCCH resource groups are associated with the code points, a PUCCH resource group of a smaller index may be associated with the initial code point (000) first, in a sequential manner (alternately, for example). For example, PUCCH resource indices ({0, 1, . . . , M−1}, for example) may be associated with the code points from the initial code point in an alternate manner.

The association between the code points and the PUCCH resource groups when the number of the PUCCH resource groups configured or activated is two and four will be described below. In the description below, eight PUCCH resources (or PUCCH resources corresponding to the eight code points) are configured for each PUCCH resource set. Note that the numbers of configurable PUCCH resource groups, code points, PUCCH resources, and the like are not limited to the numbers above.

[Number of PUCCH Resource Groups: 2]

Figures 5A, 5B:
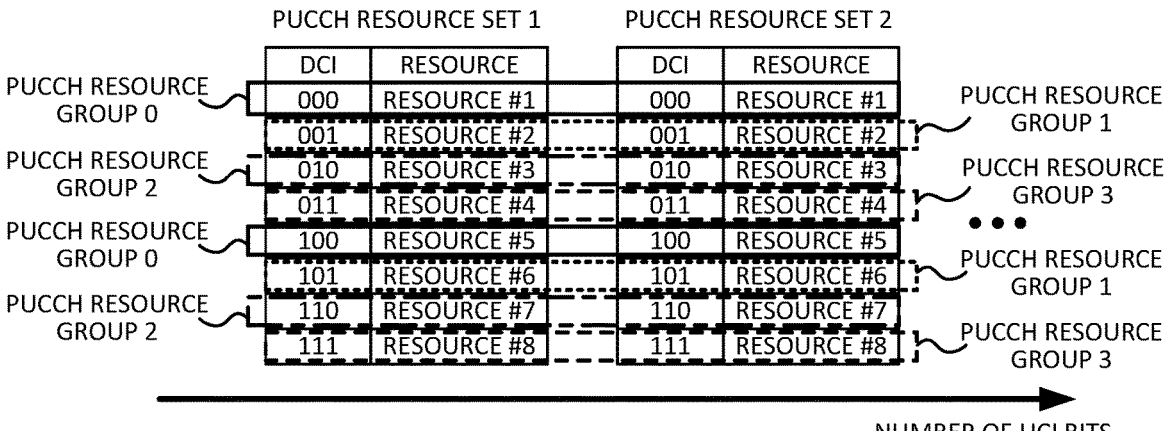
FIGS. 5A and 5B are each a diagram to show another example of a corresponding relation between PUCCH resource groups and PUCCH resources.

FIG. 5A illustrates an example of association between PUCCH resource group indices and code points (or PUCCH resources corresponding to the code points) where two PUCCH resource groups (in this case {0, 1}) are configured or activated.

PUCCH resource groups 0 and 1 are alternately associated with the code points from the initial code point. For example, PUCCH resource group 0 is associated with the nonconsecutive code points (000, 010, 100, and 110). PUCCH resource group 1 is associated with the remaining code points (nonconsecutive code points (001, 011, 101, and 111)).

Based on the association, the UE can determine a PUCCH resource group corresponding to a particular code point (or PUCCH resource) notified by a PRI field of DCI. The UE can perform PUCCH transmission by using spatial relation information corresponding to the PUCCH resource group determined. For example, when 010 is notified by a PRI field of DCI, the UE performs PUCCH transmission by using spatial relation information corresponding to PUCCH resource group 0, and PUCCH resource 3.

[Number of PUCCH Resource Groups: 4]

FIG. 5B illustrates an example of association between PUCCH resource group indices and code points where four PUCCH resource groups (in this case {0, 1, 2, 3}) are configured or activated.

PUCCH resource groups 0, 1, 2, and 3 each are associated with the respective code points from the initial code point in an alternate manner. For example, PUCCH resource group 0 is associated with nonconsecutive code points (000 and 100). PUCCH resource group 1 is associated with nonconsecutive code points (001 and 101). PUCCH resource group 2 is associated with nonconsecutive code points (010 and 110). Similarly, PUCCH resource group 3 is associated with the nonconsecutive code points (011 and 111).

Based on the association, the UE can determine a PUCCH resource group corresponding to a particular code point (or PUCCH resource) notified by a PRI field of DCI. The UE can perform PUCCH transmission by using spatial relation information corresponding to the PUCCH resource group determined. For example, when 010 is notified by a PRI field of DCI, the UE performs PUCCH transmission by using spatial relation information corresponding to PUCCH resource group 2, and PUCCH resource 3.

As described above, when a plurality of PUCCH resource groups are alternately associated with the code points, each of the PUCCH resource groups can correspond to nonconsecutive code points.

For example, when the number of PUCCH resources configured for each PUCCH resource set is less than eight (for example, when the PRI field of DCI is 2 bits or less), it is conceivable in some cases that the UE is notified of only the initial two (1 bit) or four (2 bits) code points of eight code points. In this case, association of initial consecutive code points with a single PUCCH resource group may restrict the PUCCH group (spatial relation information, for example) that can be indicated through DCI. Contrary, association of PUCCH resource groups in an alternate manner (or association with nonconsecutive code points) allows a PUCCH transmission with use of a plurality of PUCCH resource groups (spatial relation information, for example), even if the number of code points notified by DCI is small.

(Variations)

In the second association, a plurality of PUCCH resource groups are associated with the code points in a code-point-based alternate manner. However, the unit of association is not limited to one code point. For example, the unit of association may be X (X≥2).

Figure 6A:
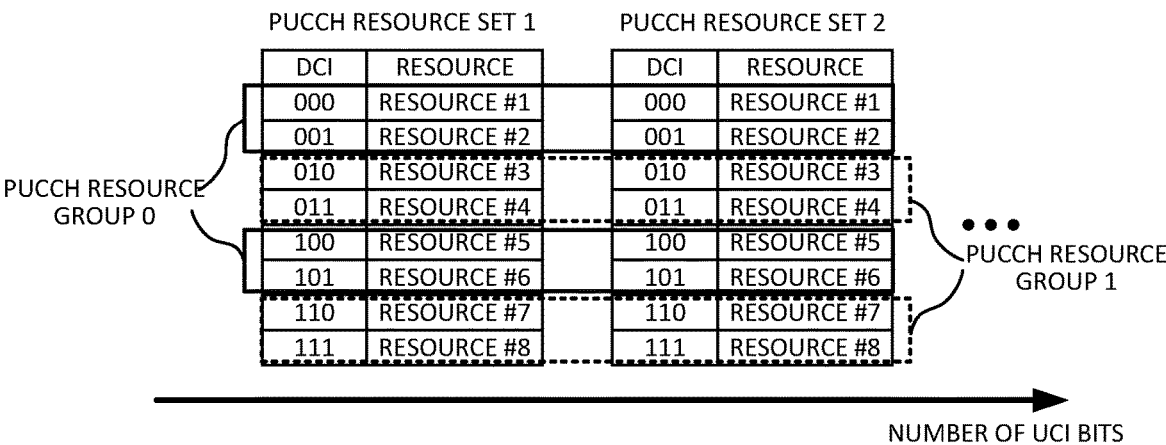
FIGS. 6A and 6B are each a diagram to show another example of a corresponding relation between PUCCH resource groups and PUCCH resources.
Figure 6B:
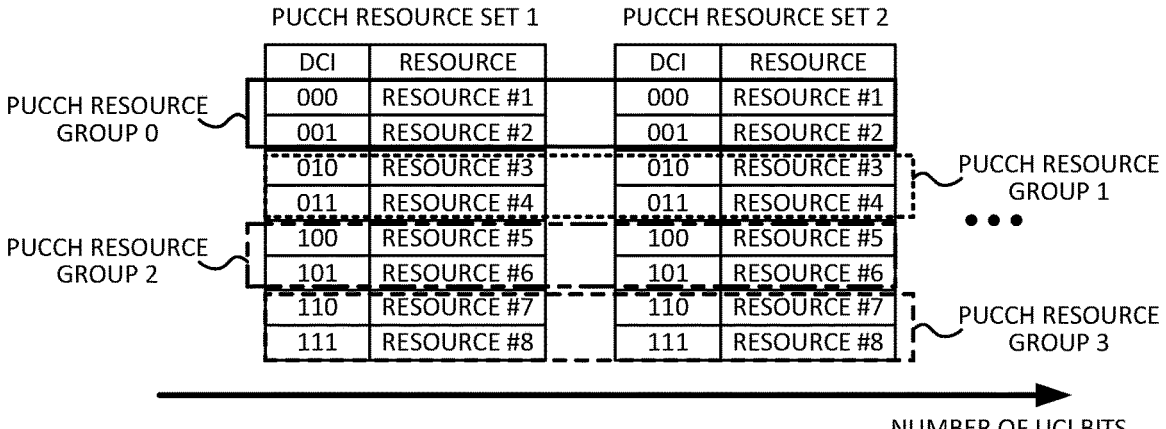

FIGS. 6A and 6B are each a diagram to show an example of association between PUCCH resource groups and code points (or PUCCH resources) when X=2.

[Number of PUCCH Resource Groups: 2]

FIG. 6A illustrates an example of association between PUCCH resource group indices and code points where two PUCCH resource groups (in this case {0, 1}) are configured or activated.

PUCCH resource groups 0 and 1 are alternately associated with the code points in the unit of X (here, X=2) from the initial code point. For example, PUCCH resource group 0 is associated with nonconsecutive code points (000, 001, 100, and 101) in the unit of two. PUCCH resource group 1 is associated with the remaining code points (nonconsecutive code points (010, 011, 110, and 111) in the unit of two).

As described above, when a plurality of PUCCH resource groups are alternately associated with the code points, each of the PUCCH resource groups can correspond to nonconsecutive code points. Additionally, association in the unit of plurality of code points can provide simplified association between the PUCCH resource groups and code blocks.

Accordingly, PUCCH transmission can be performed by using a plurality of PUCCH resource groups (pieces of spatial relation information) even if the number of code points notified by DCI is small.

[Number of PUCCH Resource Groups: 4]

FIG. 6B illustrates an example of association between PUCCH resource group indices and code points where four PUCCH resource groups (in this case {0, 1, 2, 3}) are configured or activated.

PUCCH resource groups 0, 1, 2, and 3 are associated with the code points from the initial code point alternately in this order in the unit of X (X=2). For example, PUCCH resource group 0 is associated with code points (000 and 001). PUCCH resource group 1 is associated with code points (010 and 011). PUCCH resource group 2 is associated with code points (100 and 101). PUCCH resource group 2 is associated with code points (110 and 111).

Note that, in the descriptions above, the same PUCCH resource group is configured in common for the PUCCH resources (or code points) included in each of the PUCCH resource sets (PUCCH resource sets #1 and #2, for example); however, this is not restrictive. For example, association between PUCCH resource groups and PUCCH resources (or code points) may be configured separately for each PUCCH resource set.

In the descriptions above, a case where the PUCCH resource groups and the PUCCH resources (or code points) are associated with each other in an implicit manner based on a certain rule; however, this is not restrictive. For example, association between the PUCCH resource groups and the PUCCH resources (or code points) in an explicit manner using at least one of higher layer signaling and downlink control information, for example. Alternatively, the UE may be notified of a certain rule to be used to associate with the PUCCH resources (or code points) by using higher layer signaling or the like.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 7:
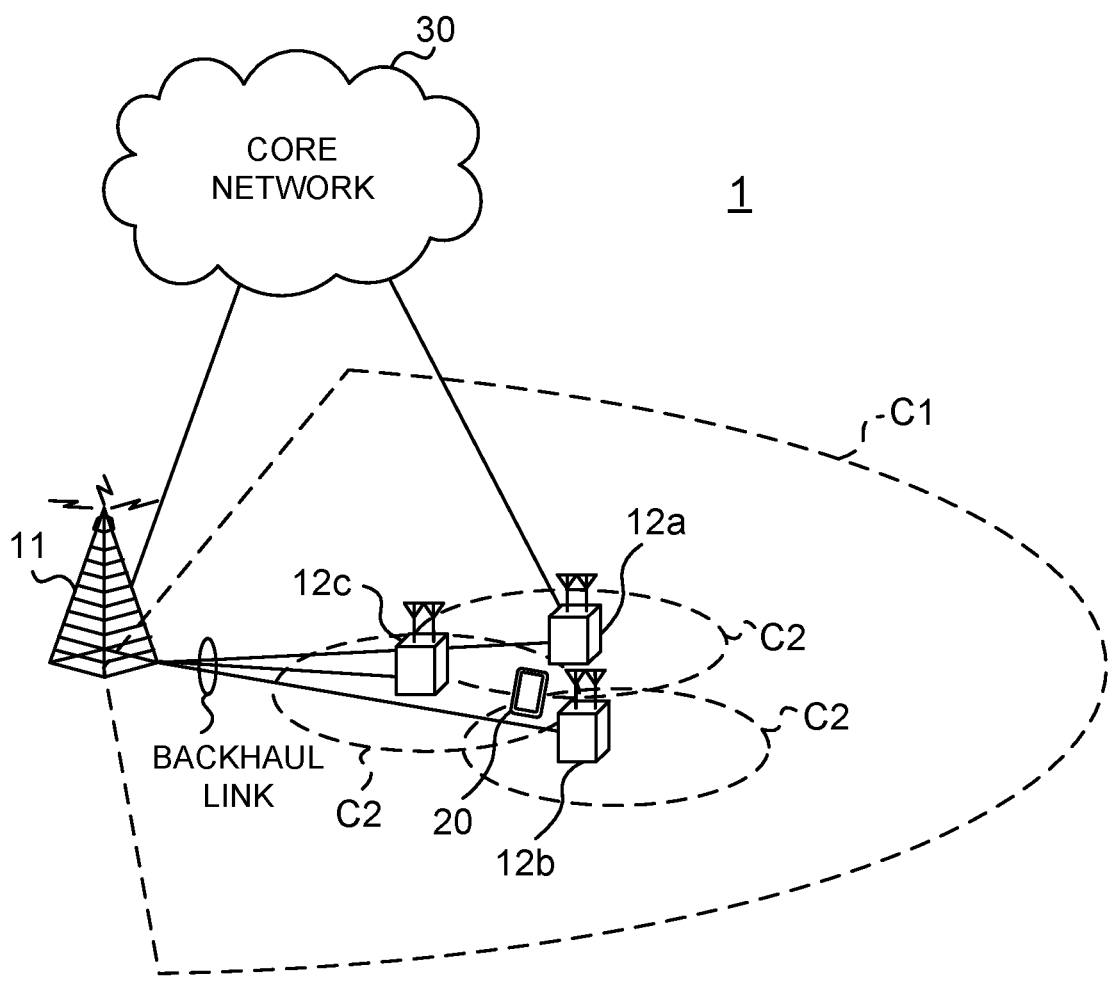
FIG. 7 is a diagram to show one example of an overall structure of a radio communication system according to one embodiment.

FIG. 7 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 8:
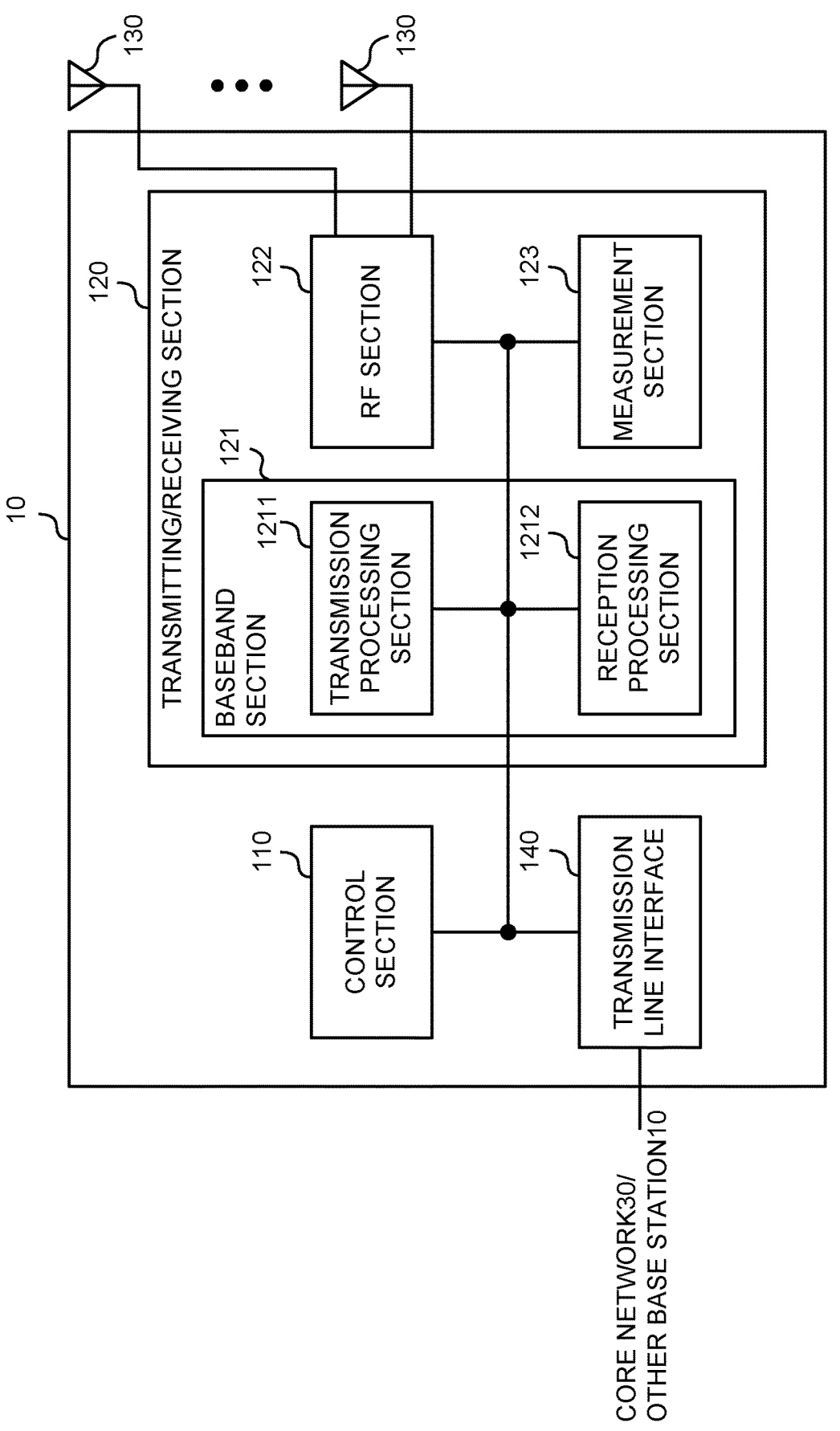
FIG. 8 is a diagram to show one example of a structure of a base station according to one embodiment.

FIG. 8 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 transmits information relating to at least one of the number and indices of uplink control channel resource.

The control section 110 may determine, according to the number of uplink control channel resource groups to be configured for the UE, to change (switch) the corresponding relation between the indices of the uplink control channel resource groups and a plurality of uplink control channel resources included in the uplink control channel resource set.

(User Terminal)

Figure 9:
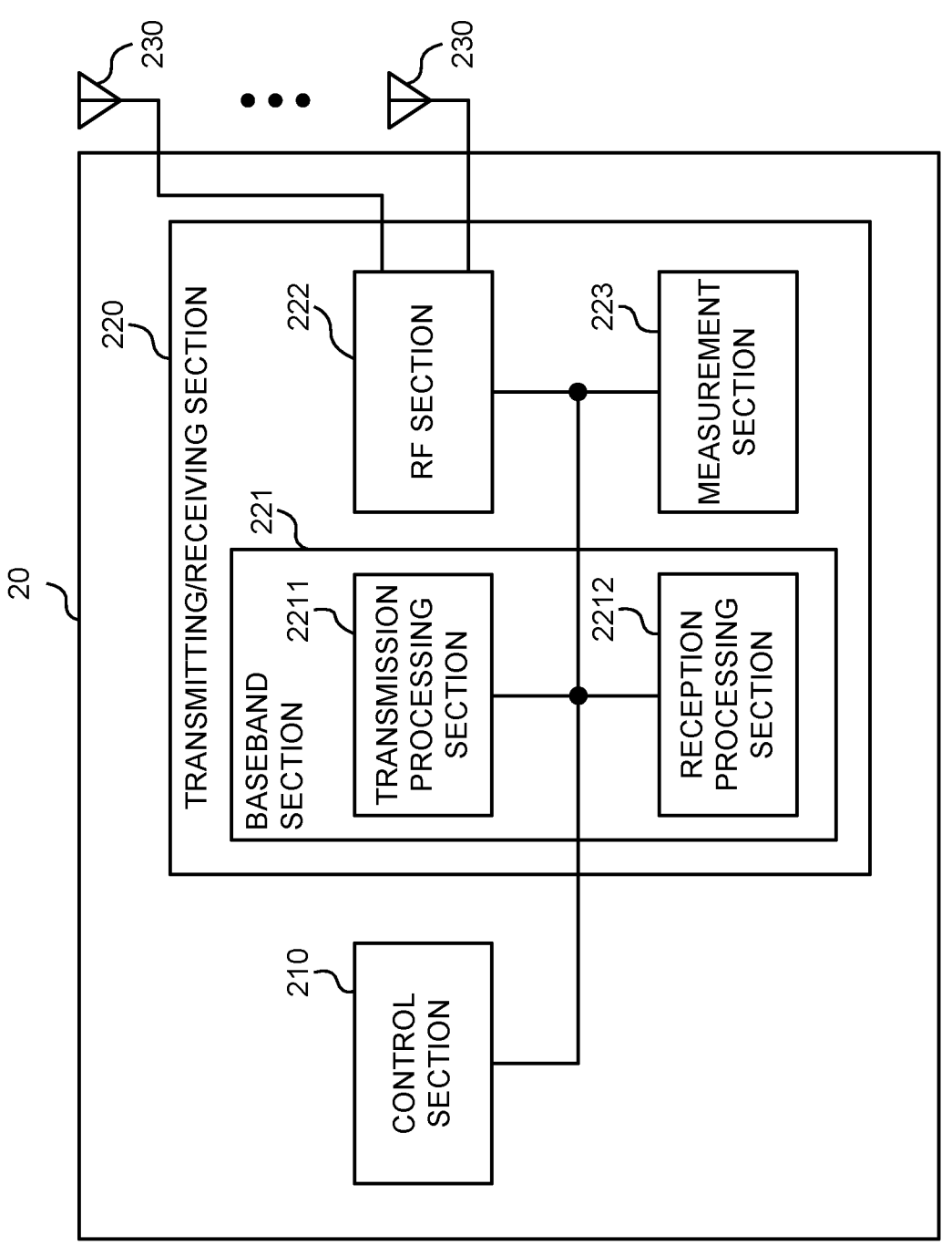
FIG. 9 is a diagram to show one example a structure of a user terminal according to one embodiment.

FIG. 9 is a diagram to show an example of a structure of the user terminal according to one embodiment. The user terminal 20 includes a control section 210, a transmitting/receiving section 220, and transmitting/receiving antennas

230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 receives information relating to at least one of the number and indices of uplink control channel resource groups. For example, the transmitting/receiving section 220 may receive at least one of the information indicating the number of the uplink control channel resource groups and the information indicating the uplink control channel resource group indices through at least one of higher layer signaling and downlink control information.

The control section 210 may determine the corresponding relation between the uplink control channel resource group indices and a plurality of uplink control channel resources included in the uplink control resource set, based on the information.

A plurality of uplink control channel resources may be associated with the corresponding code points of the uplink control channel resource notification field included in the downlink control information, and the same uplink control channel resource group index may be associated with continuous code points.

A plurality of uplink control channels resources may be associated with the corresponding code points of the uplink control channel resource notification field included in the downlink control information, and the same uplink control channel resource group index may be associated with non-contiguous code points.

The association between the uplink control channel resource group indices and the code points may be changed based on the number of uplink control channel resource groups to be configured.

When a plurality of uplink control channel resource groups are configured, the uplink control channel resource group indices and the code points may be associated in the unit of one code point or the unit of a certain number of code points.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 10:
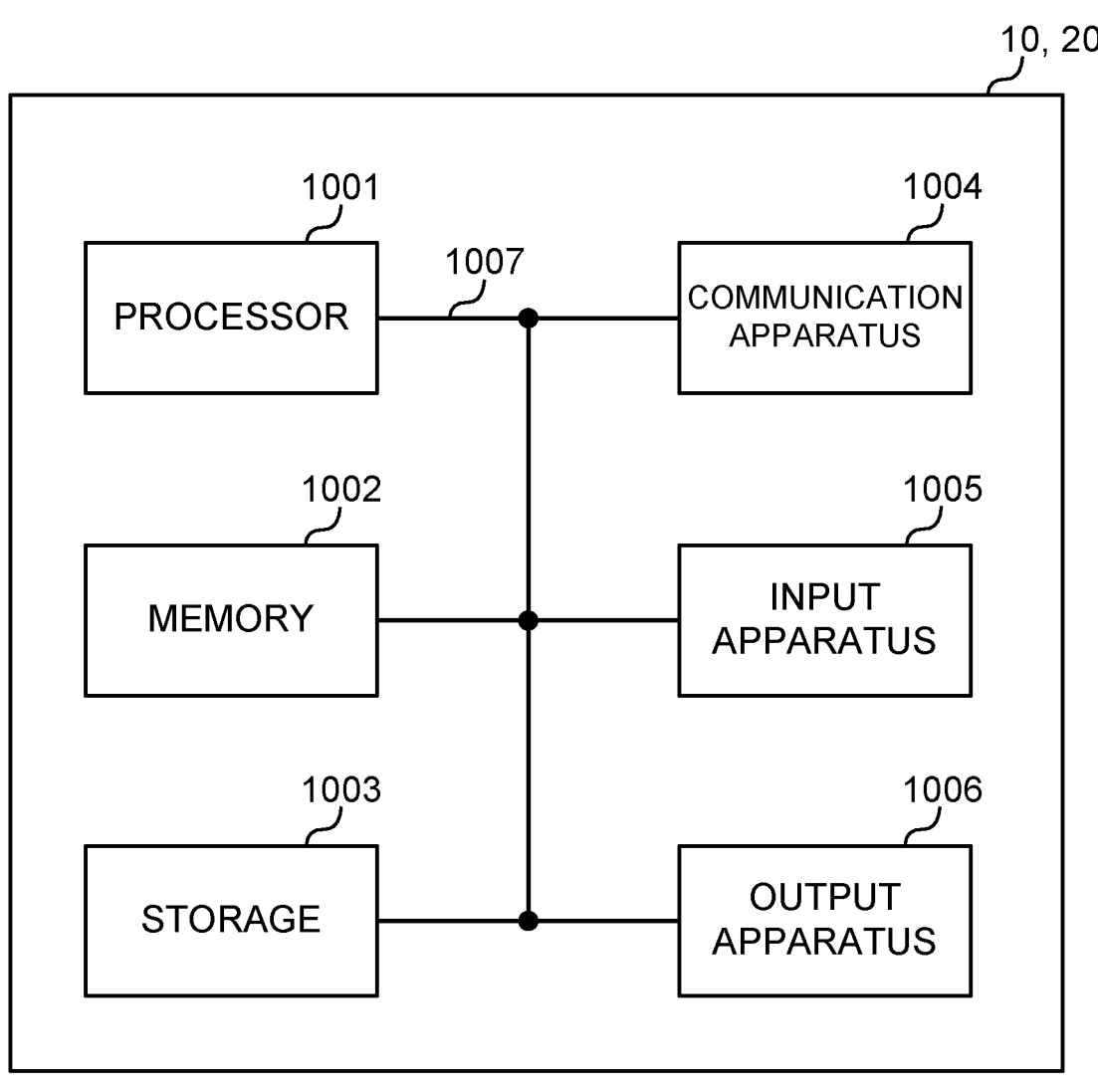
FIG. 10 is a diagram to show one example of a hardware structure of the base station and the user terminal according to one embodiment.

For example, a base station, a user terminal, and so on according to one embodiment of the present disclosure may function as a computer that executes the processes of the radio communication method of the present disclosure. FIG. 10 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a "small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a receiver that receives, per bandwidth part, higher layer signaling regarding three or more uplink control channel resource groups, spatial relation information corresponding to each of the three or more uplink control channel resource groups, and downlink control information including an uplink control channel (PUCCH) resource indicator (PRI) field with one of eight consecutive code points including 000,001,010,011,100, 101,110,111; and
a processor, coupled to a memory, that controls, based on the higher layer signaling, the spatial relation information and the downlink control information, uplink control channel transmission using an uplink control channel resource indicated by one of the eight consecutive code points of the PRI field among eight uplink control channel resources having consecutive indices,
wherein each of the eight uplink control channel resources indicated by each of the eight consecutive code points is associated with one of the three or more uplink control channel resource group,
wherein, for each of the eight uplink control channel resources indicated by each of the eight consecutive code points, an uplink control channel resource group among the three or more uplink control channel resource groups is configured by the higher layer signaling, respectively, and,
wherein the uplink control channel resource group associated with four code points in the eight consecutive code points includes two units, each of which includes two consecutive code points and the two consecutive code points included in one unit and the two consecutive code points included in the other unit are nonconsecutive.

2. A radio communication method for a terminal, comprising:
receiving, per bandwidth part, higher layer signaling regarding three or more uplink control channel resource groups spatial relation information corresponding to each of the three or more uplink control channel resource groups, and downlink control information including an uplink control channel (PUCCH) resource indicator (PRI) field with one of eight consecutive code points including 000,001,010,011,100,101,110,111; and
controlling, based on the higher layer signaling, the spatial relation information and the downlink control information, uplink control channel transmission using an uplink control channel resource indicated by one of the eight consecutive code points of the PRI field among eight uplink control channel resources having consecutive indices,
wherein each of the eight uplink control channel resources indicated by each of the eight consecutive code points is associated with one of the three or more uplink control channel resource group,
wherein, for each of the eight uplink control channel resources indicated by each of the eight consecutive code points, an uplink control channel resource group among the three or more uplink control channel resource groups is configured by the higher layer signaling, respectively, and,
wherein the uplink control channel resource group associated with four code points in the eight consecutive code points includes two units, each of which includes two consecutive code points and the two consecutive code points included in one unit and the two consecutive code points included in the other unit are nonconsecutive.

3. A base station comprising:
a transmitter that transmits, to a terminal and per bandwidth part, higher layer signaling regarding three or more uplink control channel resource groups, spatial relation information corresponding to each of the three or more uplink control channel resource groups, and downlink control information including an uplink control channel (PUCCH) resource indicator (PRI) field with one of eight consecutive code points including 000,001,010,011,100,101, 110,111; and
a processor, coupled to a memory, that controls, based on the higher layer signaling, the spatial relation information and the downlink control information, reception of an uplink control channel transmitted using an uplink control channel resource indicated by one of the eight consecutive code points of the PRI field among eight uplink control channel resources having consecutive indices,
wherein each of the eight uplink control channel resources indicated by each of the eight consecutive code points is associated with one of the three or more uplink control channel resource group,
wherein, for each of the eight uplink control channel resources indicated by each of the eight consecutive code points, an uplink control channel resource group among the three or more uplink control channel resource groups is configured by the higher layer signaling, respectively, and, wherein the uplink control channel resource group associated with four code points in the eight consecutive code points includes two units, each of which includes two consecutive code points and the two consecutive code points included in one unit and the two consecutive code points included in the other unit are nonconsecutive.

4. A system comprising a terminal and a base station, wherein the terminal comprises:

a receiver that receives, per bandwidth part, higher layer signaling regarding three or more uplink control channel resource groups, spatial relation information corresponding to each of the three or more uplink control channel resource groups, and downlink control information including an uplink control channel (PUCCH) resource indicator (PRI) field with one of eight consecutive code points including 000,001,010,011,100,101,110,111; and a processor, coupled to a memory, that controls, based on the higher layer signaling, the spatial relation information and the downlink control information, uplink control channel transmission using an uplink control channel resource indicated by one of the eight consecutive code points of the PRI field among eight uplink control channel resources having consecutive indices, wherein each of the eight uplink control channel resources indicated by each of the eight consecutive code points is associated with one of the three or more uplink control channel resource group, wherein, for each of the eight uplink control channel resources indicated by each of the eight consecutive code points, an uplink control channel resource group among the three or more uplink control channel resource groups is configured by the higher layer signaling, respectively, and, wherein the uplink control channel resource group associated with four code points in the eight consecutive code points includes two units, each of which includes two consecutive code points and the two consecutive code points included in one unit and the two consecutive code points included in the other unit are nonconsecutive, and the base station comprises:

a transmitter that transmits the higher layer signaling, the spatial relation information and the downlink control information; and a processor, coupled to a memory, that controls reception of the uplink control channel transmitted, using the uplink control channel resource, from the terminal.

* * * * *